United States Patent [19]
Cunningham et al.

[11] Patent Number: 5,854,722
[45] Date of Patent: Dec. 29, 1998

[54] METHOD AND APPARATUS FOR ROTARY ACTUATOR ARC COMPENSATION CORRECTION IN A DIRECT ACCESS STORAGE DEVICE

[75] Inventors: Earl Albert Cunningham; Kevin Jack Erickson; Hal Hjalmar Ottesen, all of Rochester, Minn.

[73] Assignee: International Business Machines Corporation, Armonk, N.Y.

[21] Appl. No.: 443,963

[22] Filed: May 18, 1995

Related U.S. Application Data

[63] Continuation of Ser. No. 112,408, Aug. 26, 1993, abandoned.

[51] Int. Cl.[6] .................................................. G11B 5/596
[52] U.S. Cl. ........................................ 360/77.04; 360/76
[58] Field of Search ............................... 360/77.04, 77.05, 360/76

[56] References Cited

U.S. PATENT DOCUMENTS

| | | | |
|---|---|---|---|
| 4,445,153 | 4/1984 | Fujimoto et al. | 360/77.02 |
| 4,616,276 | 10/1986 | Workman | 360/77.04 |
| 4,628,379 | 12/1986 | Andrews, Jr. et al. | 360/77.05 |
| 4,633,343 | 12/1986 | Maury et al. | 360/76 |
| 4,764,914 | 8/1988 | Estes et al. | 360/77.04 X |
| 4,821,125 | 4/1989 | Christensen et al. | 360/31 |
| 4,862,411 | 8/1989 | Dishon et al. | 395/454 |
| 4,878,135 | 10/1989 | Makino et al. | 360/78.04 |
| 4,894,599 | 1/1990 | Ottesen et al. | 318/636 |
| 4,939,599 | 7/1990 | Chainer et al. | 360/77.03 |
| 4,945,427 | 7/1990 | Cunningham | 360/76 X |
| 4,945,435 | 7/1990 | Boigenzahn et al. | 360/106 |
| 4,954,905 | 9/1990 | Wakabeshi et al. | 360/72.03 |
| 4,969,059 | 11/1990 | Volz et al. | 360/77.04 X |
| 5,060,095 | 10/1991 | Rigotti et al. | 360/98.01 |
| 5,073,834 | 12/1991 | Best et al. | 360/77.08 |
| 5,089,757 | 2/1992 | Wilson | 318/560 |
| 5,108,184 | 4/1992 | Brown et al. | 356/363 |
| 5,128,813 | 7/1992 | Lee | 360/78.07 |
| 5,204,793 | 4/1993 | Plonczak | 360/97.01 |
| 5,241,433 | 8/1993 | Anderson et al. | 360/77.04 |

FOREIGN PATENT DOCUMENTS

| | | |
|---|---|---|
| 0538835 | 4/1993 | European Pat. Off. . |
| 60-15872 | 1/1985 | Japan . |
| 60-170070 | 9/1985 | Japan . |
| 2501248 | 4/1990 | Japan . |
| 3-237667 | 10/1991 | Japan . |

OTHER PUBLICATIONS

J. Fox., "Runout Compensator For Disk File", IBM TDB, vol. 31, No. 8, pp. 453–454, Jan. 1989.

*Primary Examiner*—Aristotelis M. Psitos
*Assistant Examiner*—James L. Habermehl
*Attorney, Agent, or Firm*—Joan Pennington; Matthew J. Bussan; Derek P. Martin

[57] ABSTRACT

Rotary actuator arc compensation correction method and apparatus are provided for a direct access storage device (DASD). A reference feedforward correction signal is generated at each of a plurality of sectors around a predetermined track on a disk surface. A specific selected track is identified, and both magnitude and phase of the generated reference feedforward correction signal are modified to correct for the arced trajectory caused by the rotary actuator at the specific selected track. Improved actuator servo control is provided by using pseudo sector compensation to interpolate the feedforward correction signal between servo sectors.

5 Claims, 4 Drawing Sheets

METHOD AND APPARATUS FOR ROTARY ACTUATOR ARC COMPENSATION CORRECTION IN A DIRECT ACCESS STORAGE DEVICE

This application is a continuation of application Ser. No. 08/112,408, filed Aug. 26, 1993 now abandoned.

BACKGROUND OF THE INVENTION

1. Field of the Invention

The invention relates generally to a method and apparatus for rotary actuator arc compensation correction in a direct access storage device (DASD).

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

All DASD units must have a method to position each data head over the proper radial location to write a track and again, to position it very close to the same location to read the track. With the higher level files using a voice coil type of actuator, a feedback mechanism must be provided to locate and stably hold the head on a given track. Typically, track accessing and track following is provided utilizing a magnetically written pattern in the DASD unit. A dedicated servo system employs one surface of one of the disks in the DASD on which to have all the tracking and access information. A sector servo system uses small portions of tracks between each or between several sectors on each track of each data surface to provide the tracking and access information. A hybrid servo system uses both to obtain advantages of each type of servo.

The degree of tracking accuracy, i.e., the ability of the actuator servo to keep the head position discretely over the track, is governed by two factors. One factor is spacial (space), the other is temporal (time). The spacial factor corresponds to the number of servo sectors N around the track, which is a function of the linear recording density and the fixed block data format. The temporal factor corresponds to the time between servo sectors or the sampling period, which is controlled by the rotational disk velocity (RPM).

Track misregistration (TMR) error can be separated into two major components, repeatable or synchronous with disk rotation and non-repeatable or asynchronous with disk rotation. The repeatable TMR component, which can be large in case of a disk slip, can be reduced by correction compensation. A correction for radial track misregistration (TMR) versus radius is required for a DASD with a rotary actuator when tracks are written approximately uniformly on the rotary arc rather than in the radial direction. Both the gain and phase effects with radius should be compensated. Both gain and phase effects with radius produce comparable amounts of TMR error in the system.

In DASD with a rotary actuator, the head does not move in a radial direction. For many disk drives, the skew angle of the head has the back end of the head further out on the disk than the front when the head is at the inner radius. The skew gets progressively larger at larger radii. This is used to advantage in the drives by writing the tracks nearly uniformly on the arc that the head transverses from the inner radius to the outer radius. Due to the larger skew angles, the written tracks are physically smaller near the outer radius than near the inner radius. The positioning of the tracks on the arc causes the radial track pitch to be smaller at the outer radii than at inner radii, which is consistent with the smaller written tracks.

A radial movement of a disk, such as that due to disk slip, or other vibrations producing an apparent out-of-round for the track, moves the disk the same physical distance at any radius. However, in the servo system, the distance is measured in fractions of a pitch. Typically this distance is in $\frac{1}{512}$ of a customer track pitch. Since the head is moved at the skew angle for a given radius, the head must be moved further than the radial movement of the disk, and this amount is more significant at the outer radii where the skew angle is larger than at inner radii.

As a result, any compensation for radial TMR that is determined at one radius in a given number of units in the servo system will not be the same value at other radii. For example, a difference between the outside diameter (OD) and the inside diameter (ID) can be about 7%. At progressively higher track density this has some significance as an error in the corrections. Also, when a prewritten servo disk is used, there can be significant repeatable runout, thus increasing the magnitude of the error.

In known disk files which used dedicated servo control, it was necessary to add a reference profile to correct for runout due to disk slip or relative thermal motion between each head and the corresponding tracks on the data surface. These reference profiles, measured for each data surface, would have been correct if a linear actuator was used, since a linear actuator will normally follow a radial trajectory on a disk. On the other hand, a rotary actuator follows an arc rather than a radial line on the disk, thus there will be a phase error between the track where the runout was measured and any other track.

Known feedforward or profile compensation techniques used for rotary actuators to correct for runout or disk slip have a systematic error, for example, such as, up to 10% of the runout for 3.5" DASD caused by the arc made by the product head. A disk slip and/or imbalance will occur in a radial direction, and not along the head arc, thus the measured profile will only be correct at the track or cylinder of measurement. All other tracks will have an incorrect profile for optimal runout compensation.

SUMMARY OF THE INVENTION

Important objects of the present invention are to provide a method and apparatus for rotary actuator arc compensation correction in a direct access storage device; to provide such method and apparatus that compensates for a small predefined number of servo sectors around a revolution of a disk; and to provide such method and apparatus substantially without negative effects and that overcome many of the disadvantages of prior art arrangements.

In brief, the objects and advantages of the present invention are achieved by a method and apparatus for providing rotary actuator arc compensation correction in a direct access storage device (DASD). A reference feedforward correction signal is generated at each of a plurality of sectors around a predetermined track on a disk surface. A specific selected track is identified, and both magnitude and phase of the generated reference feedforward correction signal are modified to correct for the arced trajectory caused by the rotary actuator at the specific selected track.

In accordance with another feature of the invention, an improved actuator servo control is provided by using pseudo sector compensation to interpolate the feedforward correction signal between physical servo sectors.

BRIEF DESCRIPTION OF THE DRAWING

The present invention together with the above and other objects and advantages may best be understood from the following detailed description of the embodiments of the invention illustrated in the drawings, wherein.

DETAILED DESCRIPTION OF THE PREFERRED EMBODIMENT

Figure 1:
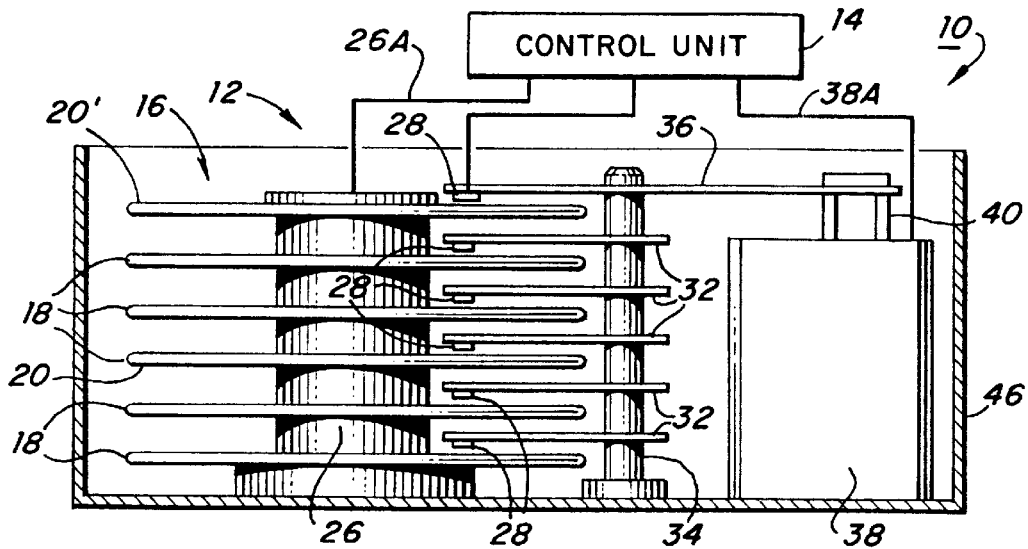
FIG. 1 is a schematic and block diagram of a data storage disk file embodying the present invention.

In FIG. 1 there is shown a partly schematic block diagram of parts of a data storage disk file 10 including a data storage medium generally designated as 12 and a control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Figure 2:
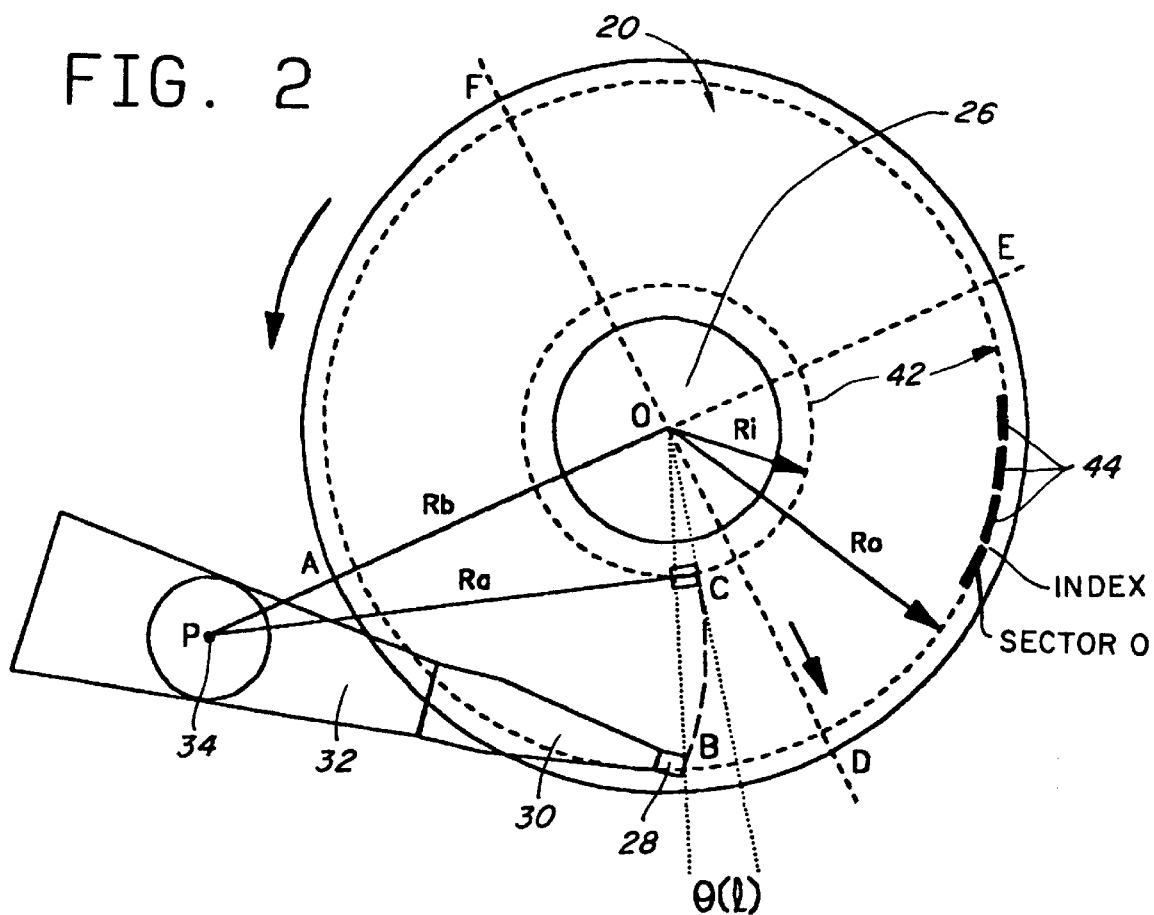
FIG. 2 is a diagram showing the accessing mechanism for a single disk surface of the apparatus of FIG. 1.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read from and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data information tracks or data cylinders 42 to be followed and access particular data sectors 44. Data storage disk file 10 is a modular unit including an enclosure or housing 46. The various components of the disk file 10 are controlled in operation by signals generated by control unit 14 such as motor control signals on line 26A and position control signals on line 38A.

Numerous data information tracks 42, each at a specific radial location, are arrayed in a concentric pattern in the magnetic medium of each disk surface 20 of data disks 18. A data cylinder includes a set of corresponding data information tracks 42 for the data surfaces 20 in the data storage disk file 10. Data information tracks 42 include a plurality of segments or data sectors 44, each for containing a predefined size of individual groups of data records which are saved for later retrieval and updates. The data information tracks 42 are disposed at predetermined positions relative to a servo reference index. In FIG. 2 one sector 44 is illustrated as SECTOR 0 with a fixed index or mark INDEX for properly locating the first data sector. The location of each next sector 44 is identified by a sector identification pulse (SID) read by transducer heads 28 from surfaces 20.

In accordance with the invention, systematic error can be effectively eliminated for each individual track using a very simple algorithm to yield optimal tracking performance for each individual data surface. The method simply modifies the Fourier coefficients as functions of the track position to obtain the correct runout compensation for a specific track before the inverse Fourier transform is taken.

Figure 3:
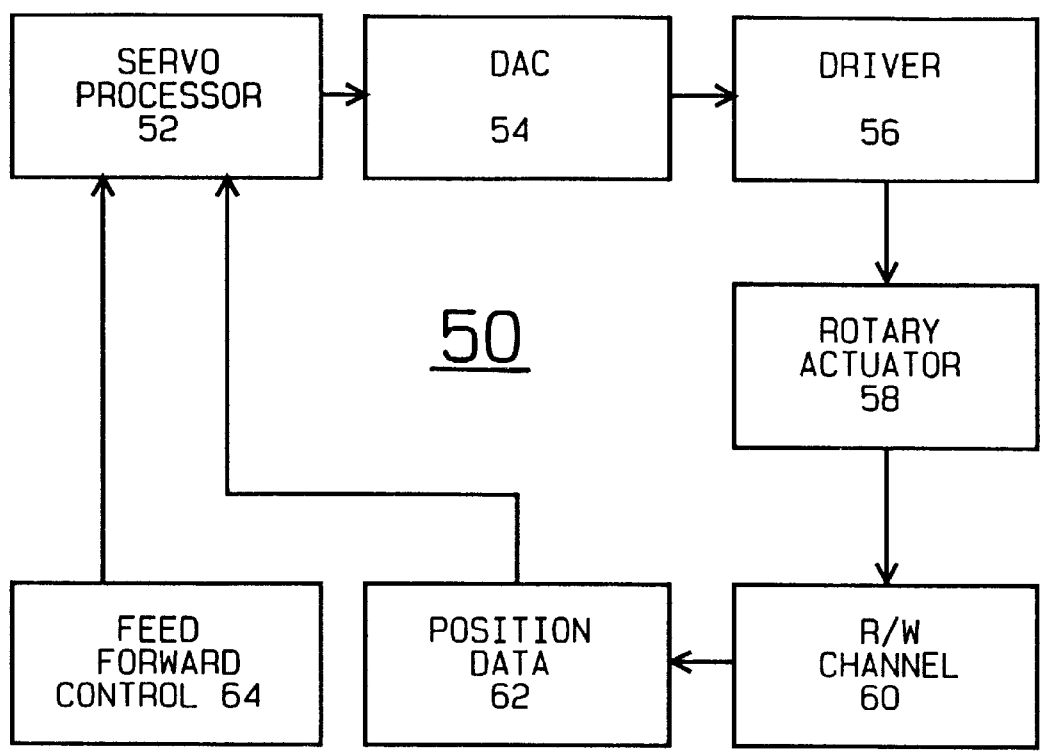
FIG. 3 is a diagram illustrating apparatus for carrying out the rotary arc compensation correction methods according to the present invention in the data storage disk file of FIG. 1.

Referring now to FIG. 3 there is shown a block diagram illustrating rotary arc compensation correction apparatus generally designated 50. A servo processor 52 provides a control signal to a digital-to-analog converter (DAC) 54 coupled to a current driver 56. Current driver 56 provides a control current to a rotary actuator 58 for moving the transducer heads 28 of a R/W channel 60. Detected position data indicated at a block 62 is coupled to the servo processor 52. Feedforward control block 64, coupled to the servo processor 52, provides control information for both magnitude and phase compensation correction versus track number or change in radius and for pseudo sector correction compensation. For proper compensation of feedforward signals to the file, both the magnitude and phase of the correction must be compensated versus the track number or change in radius.

Referring to FIG. 2, the angle $\alpha(r)$ defined by A-O-X, where X is the intersection between a circle of radius r centered at 0 and the arc B-C can conveniently be found from the Law of Cosines. This angle is referred to as $\alpha(r)$.

The cosine to $\alpha(r)$ is given in Equation 1 below:

$$\cos\alpha(r) = \frac{R_b^2 + r^2 - R_a^2}{2rR_b} \tag{1}$$

The cosine to the angle $\alpha(R_o)$ is found by substitution of $r=R_o$ in Equation 1 above, giving:

$$\cos\alpha(R_o) = \frac{R_b^2 + R_o^2 - R_a^2}{2R_bR_o} \tag{2}$$

It can be shown that the difference angle $\theta(r)$ between $\alpha(r)$ and $\alpha(R_o)$ can be approximated by the simple algorithm derived from simulations:

$$\Theta(r) = \frac{0.555}{R_b} \left[ 1 - \frac{R_b^2 - R_a^2}{rR_o} \right] (R_o - r) \tag{3}$$

Let L be an arbitrary logical cylinder number corresponding to a cylinder of radius r, and let $L_o$ be the total number of cylinders in the data band defined by $(R_o - R_i)$. Furthermore, let L be equal to zero for $r=R_o$, and $L=L_o$ for $r=R_i$. It is now possible to express Equation 3 in terms of m as $$\Theta(L) = K1 \left[ 1 - \frac{K_2}{K_3 - L} \right] L \quad (4)$$

where coefficients $K_1$, $K_2$ and $K_3$ are given by $$K_1 = \frac{0.563(R_o - R_i)}{L_o R_b} \quad (5)$$

$$K_2 = L_o \frac{R_b^2 - R_a^2}{R_o(R_o - R_i)} \quad (6)$$

and finally $$K_3 = M_o \frac{R_o}{(R_o - R_i)} \quad (7)$$

For a certain 3.5" drive with $R_a$=52 mm, $R_b$=57 mm, $R_o$=45.52 mm, Ri=20.68 mm, and at a track density of 3300 tpi, the total number of data tracks $L_o$=3227. The values for the K's are $K_1$=7.603×10$^{-5}$, $K_2$=1555.4 and $K_3$=5913.6. The corresponding angles $\alpha(R_o)$ and $\alpha(R_i)$ are 59.71° and 65.63°, respectively. The difference angle at the inner cylinder, i.e., cylinder 3227, using the approximation formula in Equation 4 yields $\theta(L_o)$=5.9189° compared to the correct value of 5.9195°. This corresponds to a maximum error of about 0.01%.

Nonlinear phase error is only a function of the hard disk drive geometry as illustrated in FIG. 2. It is therefore a predictable and systematic error and can be calculated within a very small margin for any logical cylinder L using Equation 4.

Assume for example that the runout is measured for each of N sectors at the outer track (OD) and let us designate the measured by x(n), where n is an integer n=0, 1, . . . , N−1. Furthermore, assume that the first harmonic runout component $x_1(n)$ is extracted from the OD measurement x(n). This can easily be done by Fourier Harmonic Filtering. Let the Discrete Fourier Transform (DFT) of x(n) be $$X(k) = A(k) + jB(k) \quad (8)$$

where A(k) and B(k) are the real and imaginary Fourier coefficients, respectively. The index k takes on integer values k=0, 1, . . . , N−1.

Considering that the fundamental runout component $x_1(n)$ corresponds to k=1, then it can shown that $$x_1(n) = \frac{2}{N} [A(1)\cos w_o n - B(1)\sin w_o n] \quad (9)$$

where A(1) and B(1) are given by $$A(1) = \sum_{n=0}^{n-1} x(n)\cos w_o n \quad (10)$$

and $$B(1) = -\sum_{n=0}^{N-1} x(n)\sin w_o n \quad (11)$$

It can be shown that for $\theta(L) \ll 1$ radian, which is the case here, that the phase corrected feed-forward compensated first harmonic runout signal $x_1(n,L)$ can be approximated by the equation $$x_1(n,L) = \frac{2}{N} [C(1,L)\cos w_o n - D(1,L)\sin w_o n] \quad (12)$$

where the first harmonic phase corrected Fourier coefficients for cylinder (track) L C(1,L) and D(1,L) are $$C(n,L) = A(1) + \theta(L) B(1) \quad (13)$$

$$D(n,L) = B(1) - \theta(L) A(1) \quad (14)$$

The first harmonic phase corrected Fourier co-efficients C(1,L) and D(1,L) in Equations 13 and 14 are easily calculated from Equations 4, 10 and 11.

Application of the phase corrected feedforward runout signal x(n,L) in Equation 12 for an arbitrary cylinder L will optimize the feedforward compensation and reduce the systematic error to near zero.

In accordance with another feature of the invention, a simple quadratic correction for amplitude corrected feedforward compensation as follows can provide excellent fit to the actual curve, making an assumption that the angles are small and the curve fit is for a small range. First, the radial pitch equals the pitch on the arc multiplied by the cosine of the skew angle. The cosine is the square root of 1-sine$^2$. The sine of the skew angle is approximately the skew angle in radians. The skew angle can be approximated by using an offset and an amount proportional to a radial distance. Then, even though the track pitch varies somewhat, a radial distance is related approximately linearly to a number of cylinders.

Now, let Nc=logical cylinder number, where Nc=0 on the outer track, and Nc=4118 on the inner track. Also, for reference, Nc=3002 at the switch radius where the skew angle is 11.27 degrees.

With the previous approximations, the cosine of the skew angle is approximated as:

$$\cos(skew) = 1 - ((N1 - Nc)/N2)^2 \quad (15)$$

where N1 is the offset, and N2 is a scaling constant.
For Nc=0 at SKEW=22.36 degrees
Nc=4118 at SKEW=6.57 degrees
Then N1=5831, and N2=21144
Then using:
Pitch(approx)=6.23 um $(1-((N1-Nc)/N2)^2$ and comparing to actual values we have:

| RADIAL POSITION | ACTUAL RAD. PITCH | PITCH (approx) |
|---|---|---|
| Inner Radius 20.68 mm | 6.19 um | 6.19 um |
| Switch Point 27.50 mm | 6.11 um | 6.12 um |
| Outer Radius 45.52 mm | 5.76 um | 5.76 um |

Note that for a given radial distance of repeatable runout, the number of servo counts is inversely proportional to the radial pitch.

If RRO counts are measured at track zero (at $R_o$ in FIG. 2), then the RRO counts at another cylinder are defined as follows:

$$\frac{RRO \text{ Error Counts}}{(\text{CYLINDER } Nc)} = \frac{RRO \text{ Error Counts}}{(\text{CYLINDER } 0)} \times \frac{N2^2 - N1^2}{N2^2 - (N1 - Nc)^2} \quad (16)$$

If desired, the factor on the right can be further simplified by the series for the reciprocal, using only up to the second order term in the numerator. Also, moderate improvement is provided using only up to the linear term in the series.

Following is a Table 1 listing a more complete calculation of the effect of a uniform track density on the arc, which generates a nonlinear variation with radius. The ACTUATOR ANGLE in degrees is the angle from the actuator axis to disk axis line, and to the actuator axis to the head gap line. For this example, the distance from the actuator axis to disk axis is 56.50 mm. The distance from actuator axis to gap is 55.00 mm. These distances along with the radius describe a triangle, and the Law of Cosine relates the angles to the sides. The distance along the arc is assumed to be linearly proportional to the track number. The inner track radius, outer track radius and number of tracks defines the track pitch on the arc. This geometry is also used to calculate the circumferential phase error. This was taken with the zero reference at track zero, which is at the outer data radius. The phase error is the change in the radial line to the head gap compared to the line with the head at the outer track.

The CORRECTION-ACTUAL column is the reciprocal of the COSINE of the head skew angle. This is the factor applied to the servo counts to move the same distance compared to the straight radial distance. If a measurement is taken at one radius, the amount to move at a second radius can be obtained by dividing by the factor for the first radius and multiplying by the factor for the second radius.

The CORRECTION-APPROX is a quadratic approximation of the correction from the previous column, fitting the 000 track, the 4134 inner track, and the 2067 middle track. There is a 7.4% difference between the inner and outer values, so a fixed fraction of a track runout correction would lead to a 7.4% error on the opposite end of the band. Note that the simple quadratic fit has a very small maximum error of 0.00019.

However, even if the radial magnitude of a correction is perfect, it will not have the right result if it is not applied at the correct phase angle of the disk's rotation. Note in table 1 that the PHASE ERROR has a range of 11.05 degrees. If a perfect correction for the inner track were applied with the phase from the outer track, there would be a residual error of 19% of the correction.

The last column shows a quadratic approximation of the phase error. The selection of coefficients here left a maximum error of 0.15 degrees. With this correction, the residual maximum error would be about the sine of this angle, or 0.0026 or about ¼%.

This calculation was obtained assuming the track density was perfectly uniform on the arc. This is a fair approximation. However, providing some variation of track density on the arc allows packing the tracks a little more tightly where there is better performance, thereby obtaining a little more capacity. In general, the center of the band can be packed 2 or 3 percent more than the ends and then applied in an approximate quadratic variation. Although the following table 1 does not take this effect into account, it would only require a slight change in the coefficients to include it. Thus we could also compensate for this added variation.

TABLE 1

| TRACK N | ACTUATOR ANGLE deg | RADIUS mm | CORRECTION ACTUAL | CORRECTION APPROX | PHASE ERROR (deg) | PHASE ERROR APPROX |
|---|---|---|---|---|---|---|
| 000 | 48.17 | 45.52 | 1.0813 | 1.0813 | 0.00 | 0.00 |
| 200 | 46.87 | 44.37 | 1.0760 | 1.0760 | 0.59 | 0.59 |
| 400 | 45.57 | 43.20 | 1.0708 | 1.0709 | 1.19 | 1.18 |
| 600 | 44.28 | 42.04 | 1.0658 | 1.0660 | 1.78 | 1.76 |
| 800 | 42.94 | 40.87 | 1.0611 | 1.0612 | 2.36 | 2.33 |
| 1000 | 41.68 | 39.69 | 1.0565 | 1.0566 | 2.94 | 2.90 |
| 1200 | 40.38 | 38.51 | 1.0520 | 1.0522 | 3.52 | 3.47 |
| 1400 | 39.08 | 37.32 | 1.0478 | 1.0480 | 4.10 | 4.02 |
| 1600 | 37.79 | 36.13 | 1.0437 | 1.0439 | 4.66 | 4.58 |
| 1800 | 36.49 | 34.94 | 1.0398 | 1.0400 | 5.23 | 5.12 |
| 2000 | 35.19 | 33.74 | 1.0361 | 1.0362 | 5.78 | 5.67 |
| 2200 | 33.89 | 32.53 | 1.0325 | 1.0326 | 6.33 | 6.20 |
| 2400 | 32.59 | 31.32 | 1.0291 | 1.0292 | 6.88 | 6.73 |
| 2600 | 31.30 | 30.11 | 1.0259 | 1.0260 | 7.41 | 7.26 |
| 2800 | 30.00 | 28.89 | 1.0228 | 1.0229 | 7.93 | 7.78 |
| 3000 | 28.70 | 27.67 | 1.0199 | 1.0200 | 8.45 | 8.29 |
| 3200 | 27.40 | 26.45 | 1.0172 | 1.0172 | 8.95 | 8.80 |
| 3400 | 26.10 | 25.22 | 1.0146 | 1.0146 | 9.44 | 9.30 |
| 3600 | 24.81 | 23.99 | 1.0122 | 1.0122 | 9.90 | 9.80 |
| 3800 | 23.51 | 22.76 | 1.0100 | 1.0100 | 10.36 | 10.29 |
| 4000 | 22.21 | 21.53 | 1.0079 | 1.0079 | 10.78 | 10.78 |
| 4134 | 21.34 | 20.70 | 1.0066 | 1.0066 | 11.05 | 11.10 |

Figure 4:
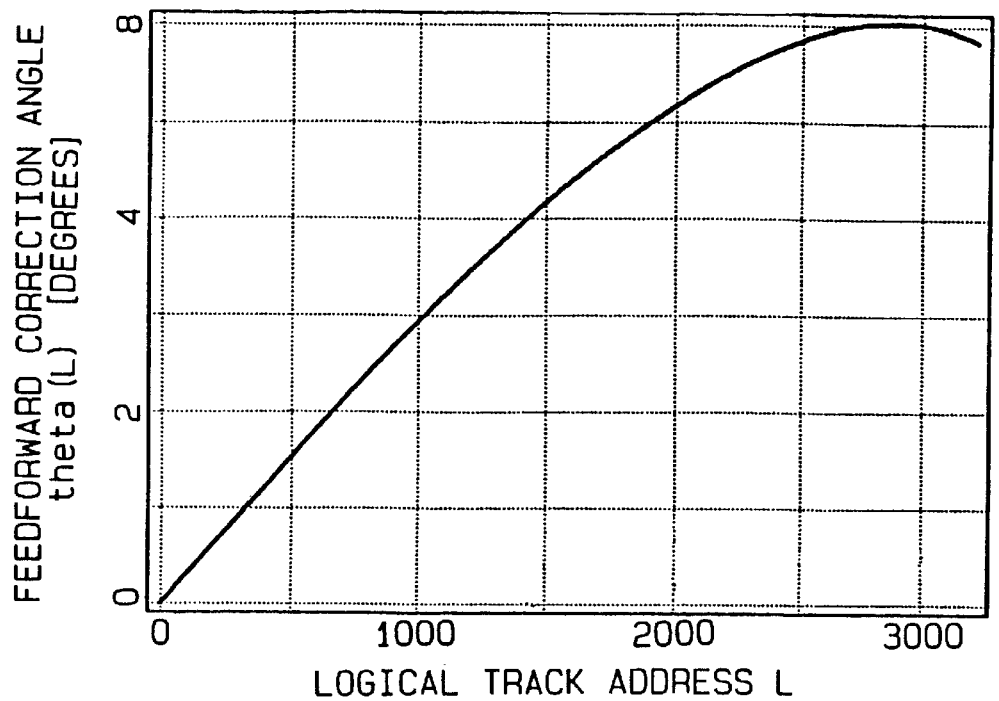
FIG. 4 is a chart illustrating feedforward correction angles relative to logical track addresses.

FIG. 4 is a chart illustrating feedforward correction angles relative to logical track addresses, taking for an example a 3.5" drive with Ra=52 mm, Rb=57 mm, Ro=45.52 mm, $R_i$=20.68 mm, and at a track density of 3300 tpi. FIG. 4 shows the required magnitude of the required correction angle θ(L) as a function of the logical track address L. It can be seen that the maximum error occurs at L-2900. Note that the phase error is non-linear; and therefore, it is more complicated to provide phase compensation correction.

Figure 5:
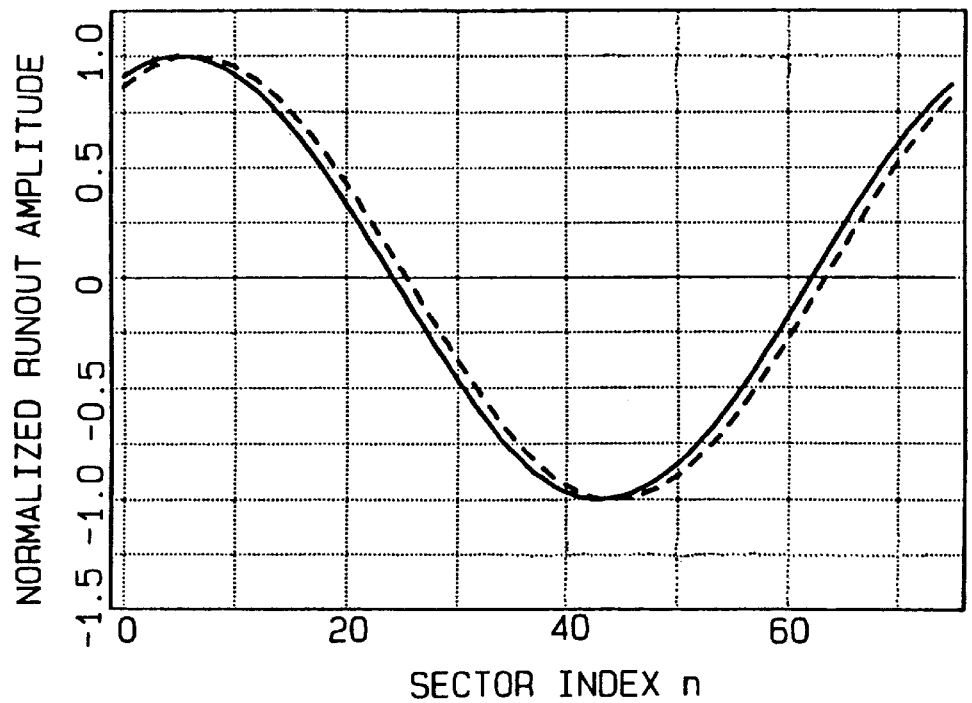
FIG. 5 is a chart illustrating normalized runout amplitude relative to sector index n at the inside diameter (ID) and at the outside diameter (OD) shown in dotted line.

FIG. 5 is a chart illustrating normalized runout amplitude relative to sector index n at the inside diameter (ID) and at the outside diameter (OD) shown in dotted line. Seventy-six servo sectors are assumed for this example and in FIG. 6. In terms of the first harmonic runout measured for the servo sectors at the outer track radius $R_o$ and the inner track radius $R_i$, there is a leading phase shift of 5.9° as measured at the inner track radius. This phase shift is clearly evident in FIG. 5, which shows normalized runout amplitudes at the extreme cylinders. The difference between the runout amplitudes in FIG. 5 is shown in FIG. 6.

Figure 6:
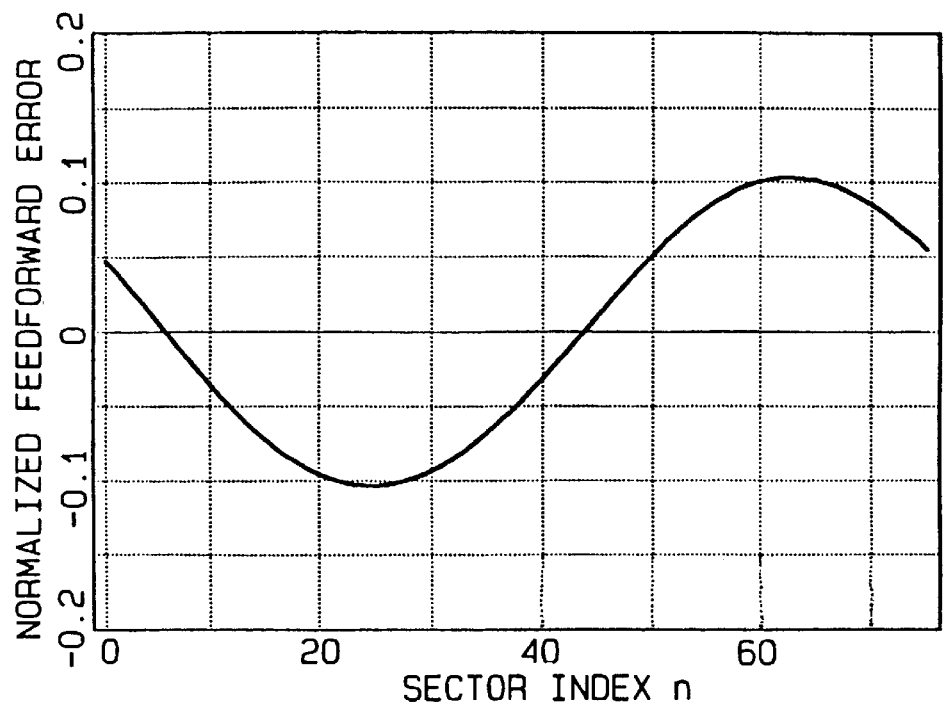
FIG. 6 is a chart illustrating normalized runout error due to phase shift between the inside diameter (ID) and the outside diameter (OD) relative to sector index n.

FIG. 6 is a chart illustrating normalized runout error due to phase shift between the inside diameter (ID) and the outside diameter (OD) relative to sector index n. This is the normalized feedforward error between inner and outer tracks. It can be seen from FIG. 6 that this error is about 10% of the runout amplitude in FIG. 5.

In accordance with another feature of the invention, much better actuator servo control and improved TMR is provided by interpolating between a sparse number of servo sectors to yield many more feedforward outputs. Typically there are 60–90 servo sectors per track. For a given linear density and data blocking format, the number of servo sectors per track decreases linearly with decreasing form factors (FF). This can be seen from Table 2 below.

TABLE 2

Servo Sector Number for Small FF DASD at Fixed Linear Density

| FORM FACTOR | SERVO SECTORS n |
|---|---|
| 3.5" | 76 |
| 2.5" | 54 |
| 1.8" | 39 |
| 1.3" | 28 |
| 1.0" | 21 |

While usually a smaller 1.0" drive spins much faster than a 3.5" drive to keep the recording heads flying, 21 sectors per track provides inadequate spacial resolution to maintain good tracking at high track densities. Thus, the method of the invention provides more spatial resolution without increasing the servo sector overhead on the disk surface.

First consider where $w_o$, the discrete frequency for N servo sectors is expressed as $$w_o = \frac{2\pi}{N} \quad (17)$$

The $\cos w_o n$ and $\sin w_o n$, used in the above Equations 12, 13, and 14 are generated by a simple code in the servo microprocessor 52. Note that Equations 10 and 11 are only updated during periodic measurements that may be a function of the ambient conditions, while Equation 12 is being used continuously.

Assume now that we modify Equation 12 by changing the discrete frequency $w_o$ to a lower discrete frequency $w_1$. Let this frequency be $$w_1 = \frac{2\pi}{M}, \quad M > N \quad (18)$$

where M is the number of virtual or pseudo sectors (M>N). Let m be the pseudo sector index such that 0<m<M−1 so that Equation 12 can be modified to yield the estimated fundamental feedforward compensation.

$$x_1(m, L) = \frac{2}{N} [C(1,L)\cos w_1 m - D(1,L)\sin w_1 m], \quad 0 \le n \le M-1 \quad (19)$$

If M=P×N where P is an integer, then there will be (P−1) pseudo correction samples generated by Equation 19 between each of the N physical servo sectors.

Figure 7:
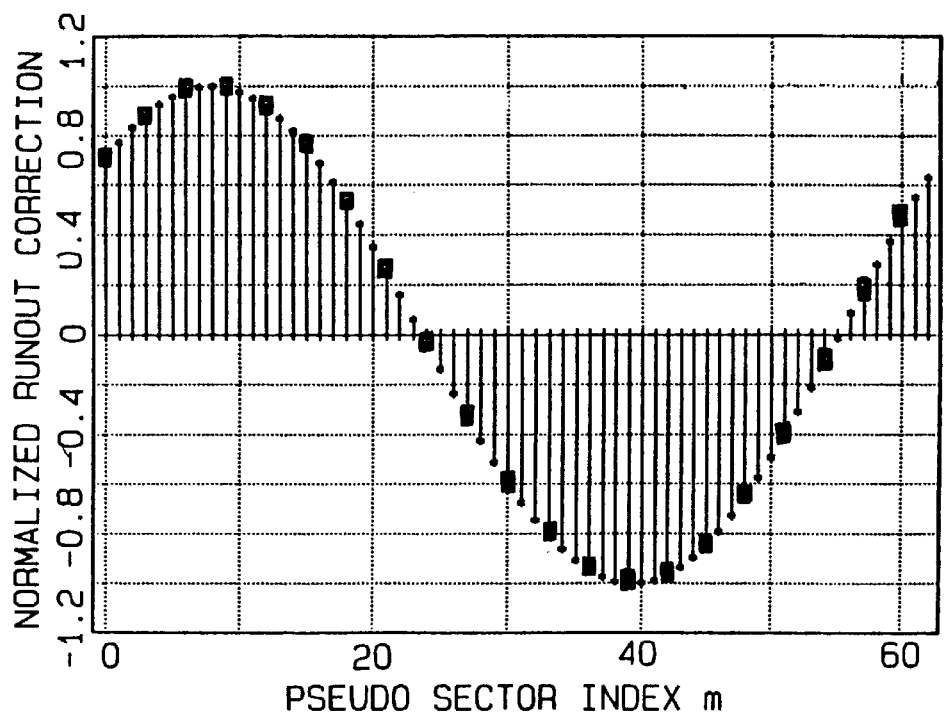
FIG. 7 is a chart illustrating simulated runout correction relative to pseudo sector index m.

Referring to FIG. 7, there is shown an arbitrary normalized runout correction for a hypothetical 1.0" form factor DASD with N=21 sectors indicated by squares and M=63 pseudo sectors (P=3) indicated by asterisks. If the 1.0" file only compensated for repeatable runout for every physical servo sector (see squares) then the correction signal which is generated by a zero-order-hold (ZOH) or the digital-to-analog converter (DAC) 54 would be rather coarse around the zero crossings of the sine wave. The pseudo sector compensation (see asterisks) provides much better resolution. The increased resolution provides a smoother control signal for the actuator 58 and thus reduces the excitation of actuator and suspension resonances. This would be the case for seek, settle, and track follow operational modes.

The number of pseudo sectors M is arbitrary and can be considered to be variable. For example, during data recovery procedures (DRP) the number of pseudo sectors M can be increased to provide better tracking. The phase corrected feedforward compensation as given by Equation 19 advantageously can be implemented in a separate module for complete freedom in the selection of M. This will minimize the impact on the regular actuator servo code.

It should be understood that this method can be used to reduce the number of physical servo sectors on larger form factor drives to yield more disk real estate for customer data. This would be the case for drives that have larger repeatable TMR components compared to non-repeatable TMR.

In brief summary, features of the invention include: Phase correction is provided for feedforward runout compensation due to recording heads arced trajectory caused by rotary actuator. Amplitude or magnitude correction also is provided for feedforward runout compensation. Using pseudo sector compensation by measuring runout using N physical sectors and estimating runout compensation for M pseudo sectors per track per surface where M>N yields a smoother feedforward control and enables improved TMR and higher track densities. Only two RAM locations for each head are required for periodic updating of algorithms, i.e., A(1) and B(1), Equations 10 and 11. Rotary arc compensation correction can be utilized in various known feedforward compensation arrangements used with rotary actuators, e.g., an iterative feedforward method. The efficient non-linear correction algorithms enable a micro-code implementation. Rotary arc compensation correction can be used for all servo methods used with rotary actuators, e.g., dedicated servo, hybrid or dedicated plus reference track servo and sector servo. Also, existing disk files can be retrofitted by a simple micro-code change to take advantage of the tracking improvements.

While the invention has been described with reference to details of the illustrated embodiment, these details are not intended to limit the scope of the invention as defined in the appended claims.

What is claimed and desired to be secured by letters patent of the united states is:

1. Apparatus for providing a feedforward correction signal to drive mechanism of a rotatable actuator in a disk storage device, comprising:

means for generating a reference feedforward correction signal at each of a plurality of sectors around a predetermined track on a disk surface, said reference feedforward correction signal varying periodically as a function of angular position of the disk, said means for generating a reference feedforward correction signal includes means for measuring a runout error at each of said plurality of sectors around said predetermined track;

means for identifying a specific selected track;

means for calculating the change in the radial line to a transducer head at said specific selected track compared to the radial line with the transducer head at the predetermined reference track; and means responsive to said identified specific selected track and to said change in radial line for modifying both magnitude and phase of said generated reference feedforward correction signal including means for calculating:

$$x_1(n, L) = \frac{2}{N} [C(1,L)\cos\omega_0 n - D(1,L)\sin\omega_0 n]$$

where the first harmonic phase corrected Fourier coefficients for track L C(1,L) and D(1,L) are $$C(1,L) = A(1) + \theta(L)B(1)$$

$$D(1,L) = B(1) - \theta(L)A(1)$$

where $A(1)$ and $B(1)$ are real and imaginary Fourier coefficients for said measured runout error and $\theta(L)$ is a difference angle between a transducer head angle at the predetermined track on a disk surface and at the specific selected track.

2. Apparatus as recited in claim 1 further includes means for calculating:

$$x_1(m, L) = \frac{2}{N} [C(1,L)\cos w_1 m - D(1,L)\sin w_1 m], \, 0 \leq m \leq M-1$$

where $M = P \times N$, where P is an integer for generating $(P-1)$ pseudo correction samples between each of the N physical servo sectors around the track on the disk surface.

3. Apparatus as recited in claim 1 further includes means for storing $A(1)$ and $B(1)$ values for each transducer head in the disk storage device.

4. A method for providing a feedforward correction signal to a drive mechanism of a rotatable actuator in a disk storage device, comprising the steps of:

generating a reference feedforward correction signal at each of a plurality of sectors around a predetermined reference track on a disk surface, said reference feedforward correction signal varying periodically as a function of angular position of the disk;

said step of generating a reference feedforward correction signal at each of a plurality of sectors around a predetermined reference track on a disk surface includes the substep of measuring a runout error at each of said plurality of sectors around said predetermined reference track;

identifying a specific selected track;

means for calculating the change in the radial line to a transducer head at said specific selected track compared to the radial line with the transducer head at the predetermined reference track;

modifying both magnitude and phase of said generated reference feedforward correction signal responsive to said identified specific selected track and said change in radial line;

said step of modifying both magnitude and phase of said generated reference feedforward correction signal includes the substep of calculating:

$$x_1(n, L) = \frac{2}{N} [C(1,L)\cos\omega_0 n - D(1,L)\sin\omega_0 n]$$

where the first harmonic phase corrected Fourier coefficients for track L $C(1,L)$ and $D(1,L)$ are $$C(1,L) = A(1) + \theta(L)B(1)$$

$$D(1,L) = B(1) - \theta(L)A(1)$$

where $A(1)$ and $B(1)$ are real and imaginary Fourier coefficients for said measured runout error and $\theta(L)$ is a difference angle between a transducer head angle at the predetermined reference track on a disk surface and at the specific selected track.

5. A method as recited in claim 4 wherein said step of modifying both magnitude and phase of said generated reference feedforward correction signal further includes the substep of calculating:

$$x_1(m, L) = \frac{2}{N} [C(1,L)\cos w_1 m - D(1,L)\sin w_1 m], \, 0 \leq m \leq M-1$$

where $M = P \times N$, where P is an integer for generating $(P-1)$ pseudo correction samples between each of the N physical servo sectors around the track on the disk surface.

\* \* \* \* \*